US009405415B2

(12) United States Patent
Morein et al.

(10) Patent No.: US 9,405,415 B2
(45) Date of Patent: Aug. 2, 2016

(54) TARGETED TRANSCAPACITANCE SENSING FOR A MATRIX SENSOR (71) Applicant: Synaptics Incorporated, San Jose, CA (US)

(72) Inventors: Stephen L. Morein, San Jose, CA (US); Petr Shepelev, San Jose, CA (US); Jeffrey Lukanc, San Jose, CA (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/212,815

(22) Filed: Mar. 14, 2014

(65) Prior Publication Data
US 2015/0091848 A1    Apr. 2, 2015

Related U.S. Application Data (60) Provisional application No. 61/885,478, filed on Oct. 1, 2013.

(51) Int. Cl.
*G06F 3/044* (2006.01)
*G06F 3/041* (2006.01)

(52) U.S. Cl.
CPC .............. G06F 3/044 (2013.01); G06F 3/0416 (2013.01)

(58) Field of Classification Search
CPC ....................................................... G06F 3/044
USPC ........................................................ 345/173
See application file for complete search history.

(56) References Cited

U.S. PATENT DOCUMENTS

| 4,550,310 | A | 10/1985 | Yamaguchi et al. |
| 5,841,078 | A | 11/1998 | Miller et al. |
| 5,945,980 | A | 8/1999 | Moissev et al. |
| 6,054,979 | A | 4/2000 | Sellers |
| 7,521,942 | B2 | 4/2009 | Reynolds |
| 7,649,524 | B2 | 1/2010 | Haim et al. |
| 7,859,521 | B2 | 12/2010 | Hotelling et al. |
| 7,911,456 | B2 | 3/2011 | Gillespie et al. |
| 7,920,129 | B2 | 4/2011 | Hotelling et al. |

(Continued)

FOREIGN PATENT DOCUMENTS

| CN | 1971352 A | 5/2007 |
| JP | H10505182 A | 5/1998 |
| JP | 2007533044 A | 11/2007 |

OTHER PUBLICATIONS

PCT international search report and written opinion of PCT/US2014/052709 dated Dec. 10, 2014.

(Continued)

*Primary Examiner* — Sahlu Okebato
(74) *Attorney, Agent, or Firm* — Patterson + Sheridan, LLP (57) ABSTRACT Embodiments described herein include a display device having a capacitive sensing device, a processing system and a method for detecting presence of an input object using a capacitive sensing device. In one embodiment, the display device includes a plurality of sensor electrodes arranged in a matrix. The processing system performs absolute capacitive sensing with the matrix of sensor electrodes. When an area of interest is detected using the absolute capacitive sensing techniques, the processing system performs targeted transcapacitance sensing using a selected subset of the sensor electrodes in the area of interest.

20 Claims, 5 Drawing Sheets

(56) References Cited

U.S. PATENT DOCUMENTS

| | | |
|---|---|---|
| 8,054,300 B2 | 11/2011 | Bernstein |
| 8,243,027 B2 | 8/2012 | Hotelling et al. |
| 8,258,986 B2 | 9/2012 | Makovetskyy |
| 8,259,076 B2 | 9/2012 | Trent, Jr. et al. |
| 8,305,359 B2 | 11/2012 | Bolender et al. |
| 8,462,135 B1 | 6/2013 | Xiao et al. |
| 8,487,907 B2 | 7/2013 | Huang et al. |
| 8,519,975 B2 | 8/2013 | Huang et al. |
| 8,525,801 B2 | 9/2013 | Huang et al. |
| 8,564,553 B2 | 10/2013 | Yeh et al. |
| 8,592,698 B2 | 11/2013 | Hung et al. |
| 8,605,056 B2 | 12/2013 | Mai et al. |
| 8,884,917 B2 | 11/2014 | Seo |
| 2005/0156881 A1 | 7/2005 | Trent et al. |
| 2006/0244733 A1 | 11/2006 | Geaghan |
| 2007/0074914 A1 | 4/2007 | Geaghan et al. |
| 2007/0229468 A1* | 10/2007 | Peng et al. .................... 345/173 |
| 2007/0247443 A1 | 10/2007 | Philipp |
| 2008/0042661 A1 | 2/2008 | Reynolds |
| 2008/0048997 A1 | 2/2008 | Gillespie et al. |
| 2008/0062140 A1 | 3/2008 | Hotelling et al. |
| 2008/0062147 A1 | 3/2008 | Hotelling et al. |
| 2008/0157782 A1 | 7/2008 | Krah |
| 2008/0158172 A1 | 7/2008 | Hotelling et al. |
| 2008/0158183 A1 | 7/2008 | Hotelling et al. |
| 2008/0162996 A1 | 7/2008 | Krah et al. |
| 2008/0162997 A1 | 7/2008 | Vu et al. |
| 2008/0246723 A1 | 10/2008 | Baumbach |
| 2009/0009195 A1 | 1/2009 | Seguine |
| 2009/0273579 A1 | 11/2009 | Zachut et al. |
| 2009/0284495 A1 | 11/2009 | Geaghan et al. |
| 2009/0315841 A1 | 12/2009 | Cheng et al. |
| 2010/0001973 A1 | 1/2010 | Hotelling et al. |
| 2010/0060608 A1 | 3/2010 | Yousefpor |
| 2010/0144391 A1 | 6/2010 | Chang et al. |
| 2010/0149110 A1 | 6/2010 | Gray |
| 2010/0164889 A1 | 7/2010 | Hristov et al. |
| 2010/0188364 A1 | 7/2010 | Lin et al. |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0245286 A1 | 9/2010 | Parker |
| 2010/0292945 A1 | 11/2010 | Reynolds et al. |
| 2011/0006832 A1 | 1/2011 | Land et al. |
| 2011/0006999 A1 | 1/2011 | Chang et al. |
| 2011/0007030 A1 | 1/2011 | Mo et al. |
| 2011/0025629 A1 | 2/2011 | Grivna et al. |
| 2011/0025635 A1 | 2/2011 | Lee |
| 2011/0050632 A1 | 3/2011 | Lin et al. |
| 2011/0050633 A1 | 3/2011 | Lin et al. |
| 2011/0050634 A1 | 3/2011 | Lin et al. |
| 2011/0242444 A1 | 10/2011 | Song |
| 2011/0248949 A1* | 10/2011 | Chang et al. .................... 345/174 |
| 2011/0298746 A1 | 12/2011 | Hotelling |
| 2012/0032911 A1 | 2/2012 | Jung et al. |
| 2012/0038585 A1 | 2/2012 | Kim |
| 2012/0043971 A1 | 2/2012 | Maharyta |
| 2012/0044199 A1 | 2/2012 | Karpin et al. |
| 2012/0050214 A1 | 3/2012 | Kremin et al. |
| 2012/0068966 A1* | 3/2012 | Washburn et al. ............. 345/174 |
| 2012/0081335 A1 | 4/2012 | Land et al. |
| 2012/0113047 A1 | 5/2012 | Hanauer et al. |
| 2012/0182251 A1 | 7/2012 | Krah |
| 2012/0218199 A1 | 8/2012 | Kim et al. |
| 2012/0306806 A1 | 12/2012 | Yang et al. |
| 2012/0319966 A1 | 12/2012 | Reynolds |
| 2013/0027346 A1 | 1/2013 | Yarosh et al. |
| 2013/0050144 A1 | 2/2013 | Reynolds |
| 2013/0057507 A1 | 3/2013 | Shin et al. |
| 2013/0088372 A1 | 4/2013 | Lundstrum et al. |
| 2013/0100071 A1 | 4/2013 | Wright et al. |
| 2013/0154996 A1 | 6/2013 | Trend et al. |
| 2013/0162570 A1 | 6/2013 | Shin et al. |
| 2013/0162583 A1 | 6/2013 | Simmons et al. |
| 2013/0176276 A1 | 7/2013 | Shepelev |
| 2013/0176280 A1 | 7/2013 | Wu et al. |
| 2013/0181916 A1 | 7/2013 | Huang et al. |
| 2013/0215047 A1 | 8/2013 | Wu et al. |
| 2013/0215053 A1 | 8/2013 | Lin et al. |
| 2013/0215075 A1 | 8/2013 | Lee et al. |
| 2013/0222047 A1 | 8/2013 | Huang et al. |
| 2013/0241870 A1 | 9/2013 | Lin et al. |
| 2013/0249852 A1 | 9/2013 | Lin et al. |
| 2013/0257767 A1 | 10/2013 | Wu et al. |
| 2013/0257797 A1 | 10/2013 | Wu at al. |
| 2013/0299330 A1 | 11/2013 | Tao et al. |
| 2013/0307811 A1 | 11/2013 | Hanssen et al. |
| 2013/0307812 A1 | 11/2013 | Hanssen et al. |
| 2013/0307813 A1 | 11/2013 | Hanssen et al. |

OTHER PUBLICATIONS

PCT International Preliminary Report on Patentability and Written Opinion of PCT/US2014/052709 dated Apr. 14, 2016.

* cited by examiner

TARGETED TRANSCAPACITANCE SENSING FOR A MATRIX SENSOR

CROSS-REFERENCE TO RELATED APPLICATIONS

This application claims benefit of U.S. provisional patent application Ser. No. 61/885,478, entitled "Targeted Transcapacitance Sensing for a Matrix Sensor", filed Oct. 1, 2013, which is herein incorporated by reference.

BACKGROUND OF INVENTION

1. Field of the Invention

Embodiments of the present disclosure generally relate to a method and apparatus for touch sensing, and more specifically, a capacitive touch sensing device having a matrix sensor configured to transcapacitive sensing, and methods for using the same.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

Embodiments described herein include a display device having a capacitive sensing device, a processing system and a method for detecting an input object in a sensing region of a capacitive sensing device, all of which include a plurality of sensor electrodes arranged in a matrix. Each sensor electrode may include one or more common electrodes that are configured for both touch sensing and display updating.

In one embodiment, the display device includes a plurality of sensor electrodes, and a processing system configured to be coupled to the plurality of sensor electrodes. The processing system is configured to modulate each of the plurality of sensor electrodes to determine changes in absolute capacitance and select a subset of the plurality of sensor electrodes based on the determined changes in absolute capacitance. The subset of sensor electrodes may be less than the plurality of sensor electrodes and includes a first sensor electrode and a second sensor electrode. The processing system is further configured to drive the first sensor electrode and receive with the second sensor electrode to determine changes in transcapacitance between the first sensor electrode and the second sensor electrode. The processing system is configured to determine positional information for an input object in a sensing region of the capacitive sensing device based on the changes in transcapacitance.

In another embodiment, a processing system is provided that is configured to drive a capacitive sensing device having a plurality of sensor electrodes arranged in a matrix. The processing system may include a sensor module having sensor circuitry configured to modulate each of the plurality of sensor electrodes to determine changes in absolute capacitance and to select a subset of the plurality of sensor electrodes based on determined changes in absolute capacitance. The selected subset of sensor electrodes may be less than the plurality of sensor electrodes and includes a first sensor electrode and a second sensor electrode. The sensor module is further configured to drive onto the first sensor electrode and receive with the second sensor electrode to determine changes in transcapacitance between the first sensor electrode and the second sensor electrode. The processing system further includes a determination module configured to determine positional information for an input object in a sensing region of the capacitive sensing device based on the changes in transcapacitance.

In another embodiment, a method is provided for detecting an input object in a sensing region of a capacitive sensing device having a plurality of sensor electrodes arranged in a matrix. The method includes modulating each of the plurality of sensor electrodes with electrical signals to determine changes in absolute capacitance and selecting a subset of the plurality of sensor electrodes based on the determined changes in absolute capacitance. The selected subset may be less than the plurality of sensor electrodes and includes a first sensor electrode and a second sensor electrode. The method further includes driving the first sensor electrode and receiving with the second sensor electrode to determine changes in transcapacitance between the first sensor electrode and the second sensor electrode.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and

DETAILED DESCRIPTION

Various embodiments of the present technology provide input devices and methods for improving usability. Specifically, an electrode matrix that is used for capacitive sensing may be integrated into a display panel of an input device. In one embodiment, the matrix sensor enables high performance absolute capacitance sensing fully overlapped with display updating functionality. However, in some cases, absolute capacitance sensing may have limitations with disambiguating between two near objects, such as two fingers during a multiple-touch gesture. In one embodiment, a "targeted" transcapacitance sensing is performed by driving one or more sensor electrodes and receiving on nearby sensor electrodes in regions where additional positional information is needed. Accordingly, embodiments of the present disclosure may advantageously obtain detailed positional information in select areas for certain input objects, such as detecting a "pinch" motion, with a high degree of accuracy without incurring the time and power costs of scanning the entire sensor using conventional transcapacitance sensing.

Figure 1:
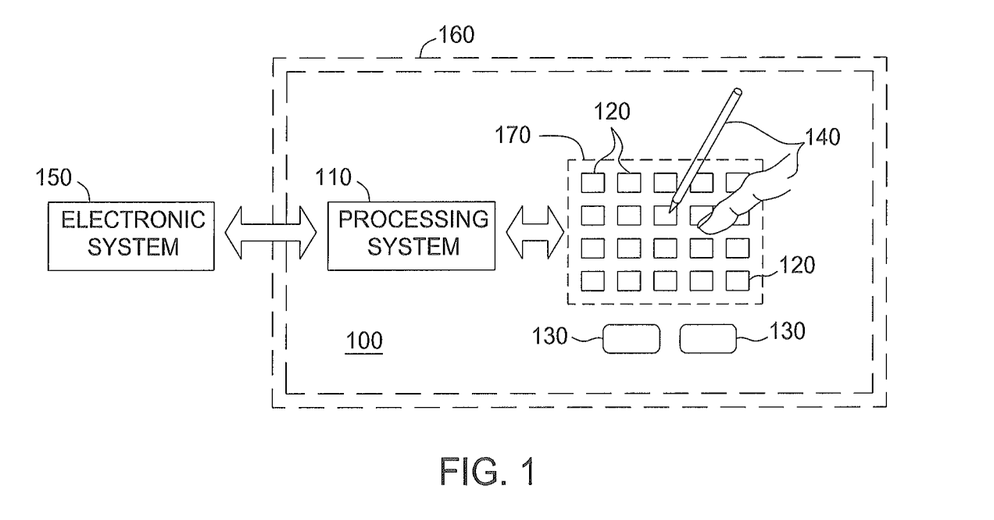
FIG. 1 is a schematic block diagram of an input device integrated into an exemplary display device, according to one embodiment described herein.

FIG. 1 is a schematic block diagram of an input device 100 integrated into an exemplary display device 160, in accordance with embodiments of the present technology. Although the illustrated embodiments of the present disclosure are shown integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing electrodes 120 for detecting user input. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing electrodes 120 to create electric fields. In some capacitive implementations, separate sensing electrodes 120 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signal. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing electrodes 120 of the input device 100. In other embodiments, components of processing system 110 are physically separate with one or more components close to sensing electrodes 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing electrodes 120 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing electrodes 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
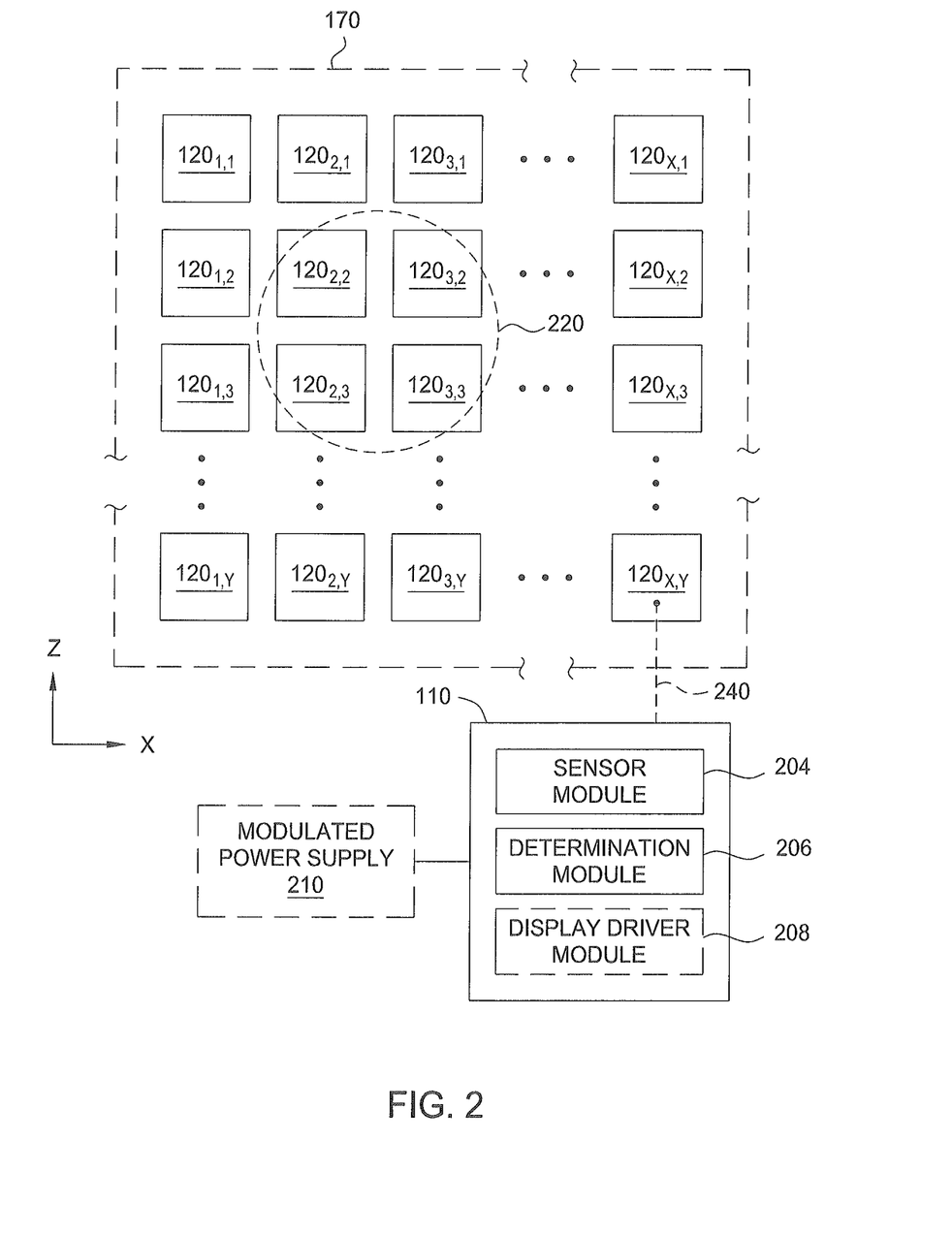
FIG. 2 illustrates a simplified exemplary array of sensor elements that may be used in the input device of FIG. 1, according to one embodiment described herein.

FIG. 2 shows a portion of an exemplary pattern of sensing electrodes 120 configured to sense in the sensing region 170 associated with the pattern, according to some embodiments. For clarity of illustration and description, FIG. 2 shows the sensor electrodes 120 in a pattern of simple rectangles and does not show various other components. The exemplary pattern comprises an array of sensor electrodes $120_{X,Y}$ (referred collectively as sensor electrodes 120) arranged in X columns and Y rows, wherein X and Y are positive integers, although one of X and Y may be zero. While the sensor electrodes are depicted as being arranged in a columns and rows, it is contemplated that the pattern of sensing electrodes 120 may comprises a plurality of sensor electrodes 120 having other configurations, such as polar arrays, repeating patterns, non-repeating patterns, a single row or column, or other suitable arrangement. Further, one or more of the columns and/or rows may be offset from the other. The sensor electrodes 120 are coupled to the processing system 110 and utilized to determine the presence (or lack thereof) of an input object 140 in the sensing region 170. Moreover, the sensor electrodes 120 may be any shape such as circular, rectangular, diamond, star, square, etc. In one embodiment, the sensor electrodes 120 may have a common shape and size.

In a first mode of operation, the arrangement of sensor electrodes 120 (120-1, 120-2, 120-3, . . . 120-n) may be utilized to detect the presence of an input object via absolute sensing techniques. That is, processing system 110 is configured to drive each sensor electrode 120 with a modulated signal and measure a capacitance between the sensor electrode 120 and the input object (e.g., free space or earth ground) based on the modulated signal, which is utilized by the processing system 110 or other processor to determine the position of the input object.

The sensor electrodes 120 are typically ohmically isolated from each other. That is, one or more insulators separate the sensor electrodes 120 and prevent them from electrically shorting to each other.

In a second mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to operate switch between any two or more of the modes described above.

The areas of localized capacitive coupling may be termed "capacitive pixels." Capacitive pixels may be formed between an individual sensor electrode 120 and ground in the first mode of operation and between groups of sensor electrodes 120 used as transmitter and receiver electrodes in the second mode of operation. The capacitive coupling changes with the proximity and motion of input objects 140 in the sensing region 170 associated with the sensing electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit a transmitter signals. Transmitters may be operated such that one transmitter electrode transmits at one time, or multiple transmitter electrodes transmit at the same time. In one embodiment, where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes 120 configured as receiver sensor electrodes may be operated singly or multiply to acquire resulting signals. The resulting signals may be used to determine measurements of the capacitive couplings at the capacitive pixels.

In other embodiments, "scanning" sensor electrodes 120 to determine these capacitive coupling comprises driven one or more of the sensor electrodes are driven and received with. In another embodiment, the sensor electrodes may be operated such that more than one sensor electrodes is driven and received with at a time, or sensor electrodes are driven and received with at the same time. In such embodiments, an absolute capacitive measurement may be obtained from each of the one or more sensor electrodes 120 simultaneously. In one embodiment, the input device 100 simultaneously drives a plurality of the sensor electrodes 120 and measures an absolute capacitive measurement for each of the driven electrodes 120 in the same touch cycle. In various embodiments, processing system 110 may configured to selectively drive and receive with a portion of sensor electrodes 120. For example, the sensor electrodes may be selected based on, but not limited to, an application running on the host processor, a status of the input device, and an operating mode of the sensing device.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object and to select a subset of the sensor electrodes to be driven and received with for transcapacitive sensing. In one embodiment, the coarse capacitive image may be used to move processing system 110 or the input device 100 out of a "doze" mode or low power mode. In one embodiment, the coarse capacitive image may be used to move a capacitive sensor integrated circuit out of a doze mode or low power mode. In another embodiment, the coarse capacitive image may be used to move a host integrated circuit out of a doze mode or low power mode. The coarse capacitive image may correspond to the entire sensor area or only to a portion of the sensor area.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the Active Matrix display such as one or more segments of a segmented Vcom electrode (common electrode(s)), a source driver line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode", since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 comprise one or more common electrodes, various other display electrodes as described above may also be used in conjunction with the common electrode or as an alternative to the common electrodes. In various embodiments, the sensor electrodes 120 may comprise the entire common electrode layer (Vcom electrode).

According to one embodiment, the processing system 110 may operate in a first mode of operation and use absolute sensing techniques to identify a localized region of interest within the sensing region 170 based on changes in absolute capacitance. Continuing to refer to FIG. 2, the processing system 110 is configured to be coupled to the sensing electrodes 120 and may be a sensor module having a sensor module 204, a determination module 206 and optionally, a display driver module 208. The sensor module 204 includes circuitry configured to modulate the sensor electrodes 120 to measure changes in absolutely capacitance corresponding to an input object in a region 220 during periods in which input sensing is desired. The sensor module 204 may be selectively coupled to one or more of the sensor electrodes 120. For example, the sensor module 204 may be coupled to all or selected portions of the sensor electrodes 120 and operate in either an absolute or transcapacitive sensing mode. In one embodiment, from the absolute capacitance image, the processing system 110 may identify areas where more details are desired. As such, the processing system 110 may select a subset of the plurality of sensor electrodes 120 based on the determined changes in absolute capacitance. In some embodiments, the sensor module 204 may be selectively coupled to the subset of the sensor electrodes 120 disposed in or proximate to the localized region 220 corresponding to the changes in absolute capacitance. In the example depicted in FIG. 2, the sensor module 204 may be selectively coupled to the subset of sensor electrodes that includes at least one of the sensor electrodes $120_{2,2}$, $120_{3,2}$, $120_{2,3}$, and $120_{3,3}$ disposed in the localized region 220. Example drive patterns for sensor electrodes based on the determined changes in absolute capacitance are described in greater detail later in conjunction with FIGS. 3A and 3B.

In one embodiment, responsive to determining the region 220 and selecting the subset of sensor electrodes 120, the processing system 110 may switch to another mode of operation and drive at least one of the subset of sensor electrodes 120 and receive with another sensor electrode to determine changes in transcapacitance. In one or more embodiments, the switching of sensor electrodes 120 between operating in an absolute capacitance sensing mode and operating as receivers and transmitters in a transcapacitance sensing mode may be accomplished by multiplexing. In some embodiments, the sensor module 204 may be configured to drive a transmitter signal onto the sensing electrodes 120 during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region 170. The modulated signal used in absolute capacitive sensing may be the same or different from the transmitter signal used in transcapacitive sensing. Various techniques for driving the sensor electrodes 120 to determine changes in transcapacitance are described in greater detail later in conjunction with FIGS. 4A and 4B.

In various embodiments, absolute capacitive sensing and display updating may occur during at least partially overlapping periods. In one or more embodiments, transcapacitive sensing and display updating may occur during at least partially overlapping periods. Further, while absolute capacitive sensing (or input sensing) and display updating may occur during at least partially overlapping periods, the sensor module 204 may be configured to transmit on one or more selected sensor electrodes 120 for supplemental capacitive sensing during time periods when shared layers (i.e., common electrodes) of the display device 160 are not being used for display updating. For example, as a common electrode is driven for display updating, the common electrode may not be driven for the supplemental capacitive sensing. As such, supplemental capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 120 for capacitive sensing during any one or more of or any combination of the different non-display update times. In one embodiment, the sensor module 204 may be configured to randomly select which non-display update times to use for supplemental capacitive sensing for purposes of noise avoidance. In one or more embodiments, the sensor module 204 may be configured to perform absolute capacitive sensing and supplemental capacitive sensing in at least partially overlapping periods, by using different frequency signals, as described later.

The sensor module 204 includes circuitry and/or firmware configured to receive a resulting signal with the sensing electrodes 120. In one embodiment, the sensor module 204 may include a plurality of receiver channels coupled to sensor electrodes 120 for measuring changes in capacitance with the sensor electrodes 120. In one embodiment, a receiver channel may be coupled to at least two sensor electrodes 120 via a multiplexer. Each receiver channel may include an analog front end (AFE) channel configured to modulate a corresponding sensor electrode and measure changes in capacitance between the corresponding sensor electrode 120 and an input object. In one embodiment, the receiver channel may include circuitry configured to measure an amount of charge needed to hold a sensor electrode 120 at a particular voltage with respect to a panel grounds. Each of the receiver channels may be selectively coupled to one or more sensor electrodes 120 with selection circuitry such as one more multiplexers. In one or more embodiments, a subset of the receiver channels may be multiplexed to selectively couple to a subset of sensor electrodes selected for supplemental capacitive sensing. The subset of receiver channels may be configured to receive resulting signals from one of more selected sensor electrodes from the selected subset to determine changes in transcapacitance. In one embodiment, the resulting signals comprise effects corresponding to transmitted transmitter signal. In one embodiment, the receiver channels may include a synchronous demodulator configured to separate out the frequency of the transmitter signal from the modulation frequency used for absolute capacitance sensing.

The determination module 206 may determine a position of the input object 140 in the sensing region 170 based on the measured changes in transcapacitance or may provide a signal including information indicative of the resulting signal to another module or processor, for example, a processor of the electronic system 150 (i.e., a host processor), for determining the position of the input object 140 in the sensing region 170.

In one embodiment, the display driver module 208 includes circuitry confirmed to provide display image update information to the display of the display device 160 during non-sensing (e.g., display updating) periods. The display driver module 208 may be included in or separate from the processing system 110. In one embodiment, the processing system 110 may include an integrated controller that includes the sensor module 204 and the display driver module 208, although other configurations of the modules may be used. For example, in another embodiment, the processing system 110 may include a first integrated controller that includes a portion of the sensor module 204 and a second integrated controller that includes the display driver module 208 are depicted as discrete elements within the processing system 110.

In one embodiment, the input device 100 may include a modulated power supply 210 configured to generate modulated power supply signals and a modulated ground signal provided to display elements and input sensing elements within the input device 100. The modulated power supply signals and modulated ground signal cause the various components of the input device 100 described above that would normally be held at a substantially constant voltage with respect to earth ground to instead be driven with a modulated signal with respect to earth ground. In other words, by powering the input device 100 with a modulated power supply, all signals in the input device 100 are modulated. The sensor electrodes 120 can then be operated simply by maintaining the sensor electrodes 120 at a constant voltage with respect to the modulated ground signal. Since the input object 140 is (generally) at earth ground, the voltage differential between the sensor electrodes 120 and the input object 140 varies with time.

As discussed above, the sensor electrodes 120 may be formed as discrete geometric forms, polygons, bars, pads, lines or other shape, which are ohmically isolated from one another. The sensor electrodes 120 may be electrically coupled through circuitry to form electrodes of having larger plan area relative to a discrete one of the sensor electrodes 120. The sensor electrodes 120 may be fabricated from opaque or non-opaque conductive materials. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, and conductive carbon materials, among others. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed a mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not similar, and one of the length and width may be in the range of about 1 to about 2 mm. Further, on various embodiments, the sensor electrodes 120 may comprise a center to center pitch in the range of about 4 to about 5 mm; however, in other embodiments, the pitch may be less than about 4 mm or greater than about 5 mm.

The sensor electrodes 120 may be coupled to the processing system 110 utilizing conductive routing traces 240 (shown in phantom). The conductive routing traces 240 may be formed in the same plane at least one of the sensor electrodes 120 or may be formed on one or more separate substrates and connected to the respective sensor electrodes 120 by vias (not shown). Conductive routing traces 240 may be formed on a metal layer disposed such that the sensor electrodes 120 are between the metal layer and the input object. In one embodiment the metal layer comprises source driver lines and/or gate lines for a display device. The conductive routing traces 240 (and vias between the traces) may be obscured from a user by a black mask layer disposed between the traces and the user of the display device. At least one of the conductive routing traces 240 may comprise one or more routing traces (conductors) in the source driver metal layer. In one or more embodiments, such a layer may be referred to as metal interconnect layer two. Further, conductive routing traces 240 may be disposed on a metal layer between source driver lines. Alternately, at least one of the conductive routing traces 240 may comprise one or more conductors in the gate driver metal layer or gate driver lines not configured for display updating. Further, conductive routing traces 240 may be disposed on a metal layer between gate driver lines. In another embodiment, at least one of the conductive routing traces 240 may comprise one or more conductors in the Vcom jumper metal layer or Vcom lines not otherwise configured for display updating. Further, conductive routing traces 240 may be disposed on a metal layer between gate electrodes. In other embodiments, the metal layer is included in addition to a layer comprising the source driver lines and/or gate lines. A portion of the conductive traces 240 may also be formed laterally outward of the areal bounds of the sensing electrodes 120. In various embodiments, the conductive routing traces 240 may be disposed in a Vcom electrode jumper layer. The Vcom electrode jumper layer may be referred to as metal layer three or a metal interconnect layer three. In one embodiment, conductive traces may be disposed on both a source driver layer and a Vcom electrode jumper layer. In various embodiments, the display device may comprise a "dual gate" or "half source driver" configuration, allowing conductive routing traces 240 to be disposed between source drivers on the source driver layer. In one or more embodiments, orthogonal directions of connections between the conductive routing traces 240 they may be place on separate layers with vias between them. In one or more embodiments, due to orthogonal directions of connections between the conductive routing traces 240, the conductive traces may be placed on separate layers with vias between the traces.

A multiplexer (or similar circuit element) may be coupled to the conductive routing traces 240 such that the sensor electrodes 120 may be individually coupled to the processing system 110 when sharing a conductive routing trace 240. In one other example, each sensor electrode 120 may be coupled to a different conductive routing trace 240, where each conductive routing trace 240 is coupled to a different pin of processing system 110. Processing system 110 may be configured to simultaneously receive with multiple sensor electrodes 120 or receive with each sensor electrode 120 independently. In one embodiment, processing system 110 may be configured to receive with a plurality of sensor electrodes 120 using a scanning, time multiplexed scheme when more than one sensor electrode 120 is driven with a transmitter signal.

Patterns for Capacitive Sensing

Figure 3A:
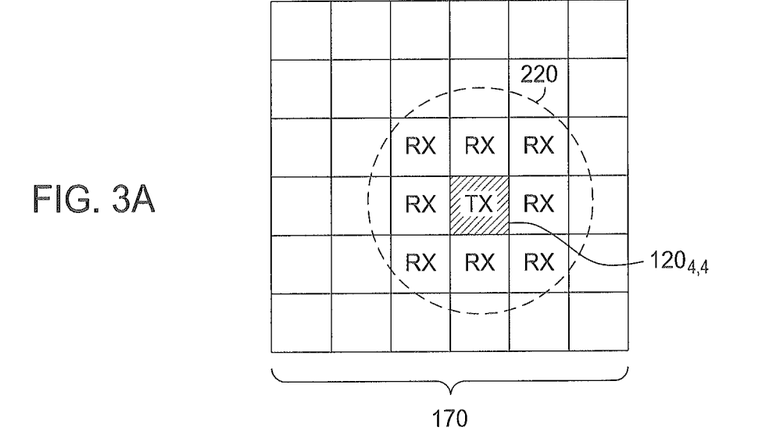
FIGS. 3A and 3B are simplified schematic plan view of sensor electrodes configured for operating in a transcapacitive mode of operation, according to embodiments described herein.

FIG. 3A is a simplified schematic plan view of sensor electrodes 120 configured for operating in a transcapacitive mode of operation, according to one embodiment of the present disclosure. As mentioned earlier, one or more sensor elements may be selected within or proximate to region 220, which was determined based on detected changes in absolute capacitance. In one embodiment, the processing system 110 may designate one or more sensor elements 120 as transmitter electrodes (identified as "TX") and neighboring sensor elements 120 as receiver electrodes (identified as "RX") in the region 220. For example, as shown in FIG. 3A, the processing system 110 may select a sensor element 120$_{4,4}$ disposed centrally within the region 220 as a transmitter electrode in response to detecting changes in absolute capacitance in the region 220. As shown, the processing system 110 may further select the sensor electrodes adjacent to the sensor element 120$_{4,4}$ as receiver electrodes for receiving resulting signals. While FIG. 3A depicts example drive pattern for operating in a transcapacitive mode of operation, it should be recognized that other patterns of one or more transmitter electrodes having other geometric arrangements may be used, alone or in conjunction, such as in an alternating manner, including cross or "T" drive patterns, "X" drive patterns, etc.

Figure 3B:
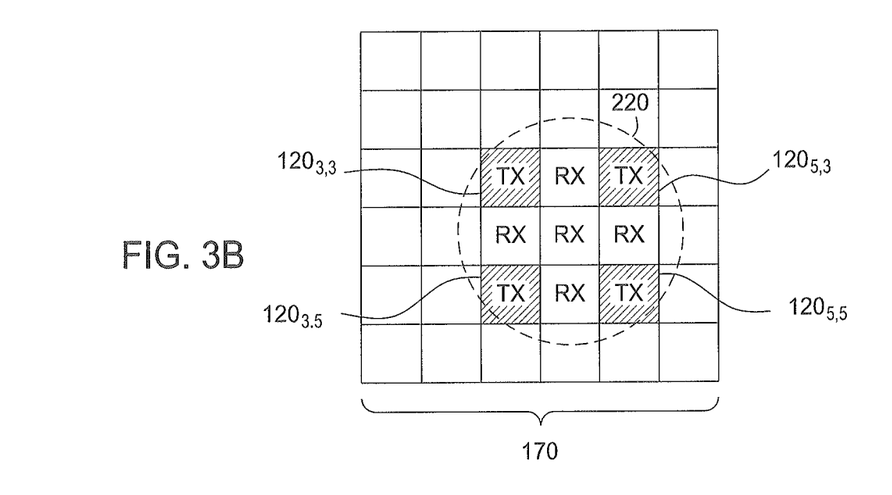

In another embodiment, the selected subset of sensor electrodes 120 designated as transmitter electrodes may be driven in accordance to a sequential pattern, as shown in FIG. 3B. FIG. 3B is another simplified schematic plan view of sensor electrodes 120 configure to operating in a transcapacitive mode of operation, according to one embodiment of the present disclosure. The processing system 110 may select a subset of sensor elements 120 disposed within or proximate to the region 220 as transmitter electrodes (i.e., "TX") to be driven sequentially for capacitive sensing. For example, as shown in FIG. 3B, the processing system 110 may select the subset of sensor electrodes 120$_{3,3}$, 120$_{5,3}$, 120$_{3,5}$, and 120$_{5,5}$ that outline the region 220 to be driven for sequentially capacitive sensing. In one embodiment, the sensor module 204 may be configured to selectively and sequentially couple to each of the selected subset of sensor electrodes (e.g., 120$_{3,3}$, 120$_{5,3}$, 120$_{3,5}$, and 120$_{5,5}$) and drive a transmitter signal for capacitive sensing. For example, during four touch cycles, the sensor module 204 may first drive sensor electrode 120$_{5,3}$ with a transmitter signal, then drive sensor electrode 120$_{5,5}$, and continue rotating the sensor electrode designated as the transmitter electrode a clockwise sequence, although other types of patterns and sequences may be utilized. The sensor module 204 receives resulting signals with one or more neighboring sensor electrodes designated as receiver electrodes (i.e., "RX").

Figure 4A:
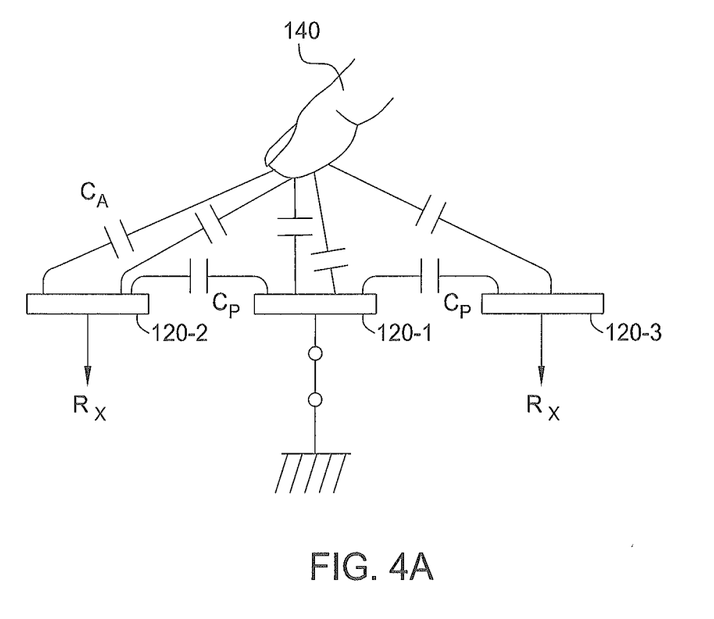
FIG. 4A is a cross-sectional partial schematic view of the input device performing "pseudo-transcapacitance" sensing, according to one embodiment of the present disclosure.

FIG. 4A is a cross-sectional partial schematic view of the input device 100 performing "pseudo-transcapacitance" sensing, according to one embodiment of the present disclosure. In one embodiment, to perform supplemental capacitive sensing of input object 140, the sensor module 204 may ground the one or more selected sensor electrodes (e.g., 120-1) designated as a transmitter electrode, thereby coupling through the input object 140 to sensor electrodes (e.g., 120-2 and 120-3) designated as received electrodes. In one embodiment, the sensor electrode 120-1 is selectively driven with a substantially constant ground signal, and is depicted in FIG. 4A as earth ground to distinguish from the modulated ground signal provided by the modulated power supply 210. The receiver module 106 may receive resulting signals on the receiver electrodes corresponding to changes in capacitance from the input object 140. It has been determined that the capacitance between the transmitter electrode (i.e., 120-1) and the input object 140 being detected increases the signal that the receiver electrodes (i.e., 120-2 and 120-3) receive, as represented in FIG. 4A by increased capacitive coupling $C_A$ relative to the parasitic capacitance $C_P$ between nearby sensor electrodes 120. It has been further determined that this grounding may cause the receiver electrodes to perceive the transmitter electrode 120-1 as strongly transmitting, which may be calibrated out as a background capacitance by grounding sensor electrodes 120 and measuring a baseline capacitive image.

Figure 4B:
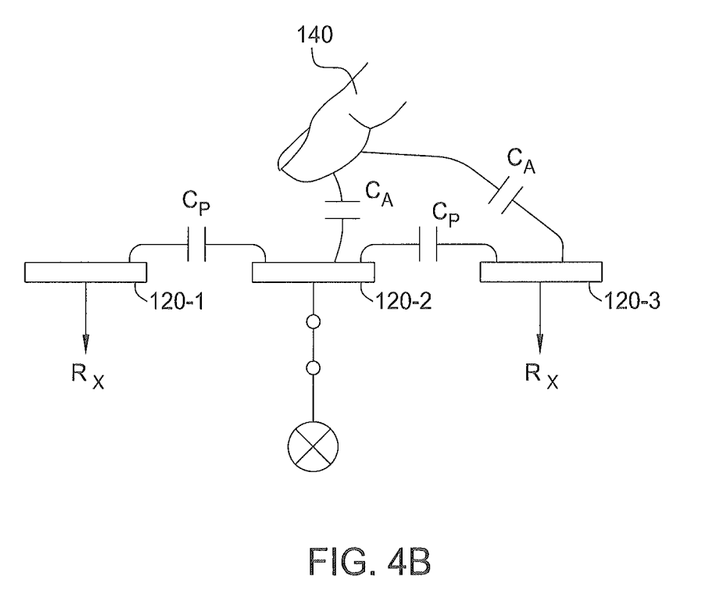
FIG. 4B is a cross-sectional partial schematic view of the input device 100 performing transcapacitance sensing, according to one embodiment of the present disclosure.

FIG. 4B is a cross-sectional partial schematic view of the input device 100 performing transcapacitance sensing, according to one embodiment of the present disclosure. In one or more embodiments, to perform supplemental capacitive sensing of input object 140, the sensor module 204 drives a transmitter signal on the one or more sensor electrodes 120 selected for supplemental capacitive sensing. In one embodiment, the sensor module 204 may drive the transmitter signal on sensor electrodes 120 during periods in which the panel modulation of the display device 160 is paused. In an alternative embodiment, the sensor module 204 may drive sensor electrodes 120 during periods overlapping with absolute capacitance sensing using a transmitter signal that has a frequency different than the modulated frequency used for absolute capacitance sensing. In some embodiments, the transmitter signal may have a frequency that is substantially orthogonal to the modulated frequency used for absolute sensing. Accordingly, the receiver module 106 receives resulting signals with the receiver electrodes 120-1 and 120-3 corresponding to changes in transcapacitance (i.e., between capacitive coupling $C_A$ and parasitic capacitance $C_P$). In such embodiments, using a transmitter signal having different frequency advantageously allows targeted capacitive sensing to be performed without having to pause the panel modulation of the display device 160.

Figure 5:
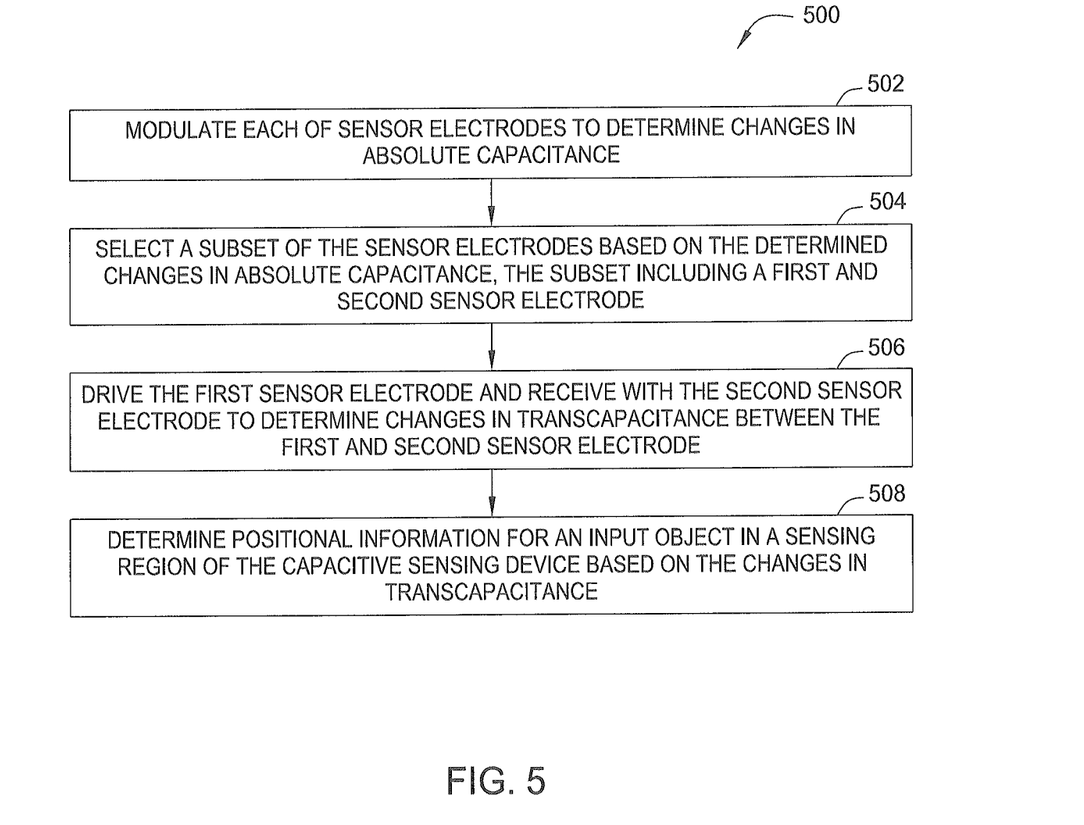
FIG. 5 is a flow diagram of a method for detecting presence of an input object in a capacitive sensing region, according to one embodiment of the present disclosure.

FIG. 5 is a flow diagram of a method 500 for detecting an input object in a sensing region of a capacitive sensing device, according to one embodiment of the present disclosure. The capacitive sensing device may include a plurality of sensor electrodes arranged in a matrix, each sensor electrode comprising one or more common electrodes that are configured for both touch sensing and display updating.

The method 500 begins at step 502, where the processing system 110 (e.g., by operation of the sensor module 204) modulates each of the plurality of sensor electrodes to determine changes in absolute capacitance. In some embodiments, the processing system 110 may modulate each of the plurality of sensor electrodes in a time period that at least partially overlaps with display updating, or in other embodiments, in a time period that is non-overlapping with display updating.

At step 504, the processing system 110 selects a subset of the plurality of sensor electrodes based on the determined changes in absolute capacitance. The subset of sensor electrodes may be less than the plurality of sensor electrodes and includes a first sensor electrode and a second sensor electrode.

At step 506, the processing system 110 (e.g., by operation of the sensor module 204) drives the first sensor electrode and receives with the second sensor electrode to determine changes in transcapacitance between the first sensor electrode and the second sensor electrode. In some embodiments, the processing system 110 drives a substantially constant voltage onto the first sensor electrode and modulates the second sensor electrode with a modulated signal, wherein an input object couples the substantially constant voltage with the modulated signal. In other embodiments, the processing system 110 drives a transmitter signal on the first sensor electrode and receives a resulting signal with the second sensor electrode. In embodiments where the processing system 110 is configured to drive the plurality of common electrodes for display updating with a display update signal that is based on a modulated reference signal having a first frequency, the processing system 110 may drive the first sensor electrode with a transmitter signal having a second frequency that is substantially orthogonal to the first frequency.

At step 508, the processing system 110 (e.g., by operation of a determination module 206) determines positional information for an input object in a sensing region of the capacitive sensing device based on the changes in transcapacitance.

In one or more embodiments, the processing system 110 (e.g., by operation of the sensor module 204) may select multiple subsets of sensor electrodes based on determined changes in absolute capacitance (simultaneously), and determine positional information based on changes in transcapacitance among those multiple subsets of sensor electrodes. For example, the processing system 110 may select a second subset of the plurality of sensor electrodes based on the determined changes in absolute capacitance. This second subset is less than the plurality of sensor electrodes and includes a third sensor electrode and a fourth sensor electrode. The processing system 110 may then drive the third sensor electrode and receive with the fourth sensor electrode to determine changes in transcapacitance between the third sensor electrode and the fourth sensor electrode. In some embodiments, the driving the first sensor electrode and receiving with the second sensor electrode (e.g., in step 506) and driving the third sensor electrode and receiving with the fourth sensor electrode may occur simultaneously. The processing system 110 (e.g., by operation of the determination module 206) may determine positional information for a second input in the sensing region based on the changes in transcapacitance between the third sensor electrode and the fourth sensor electrode.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. An input device comprising a display device having an integrated capacitive sensing device, the input device comprising:
 a plurality of sensor electrodes arranged in a matrix, each sensor electrode comprising one or more common electrodes that are configured for both touch sensing and display updating; and
 a processing system configured to be coupled to the plurality of sensor electrodes, wherein the processing system is configured to:

modulate each of the plurality of sensor electrodes to determine changes in absolute capacitance;

select a subset of the plurality of sensor electrodes based on the determined changes in absolute capacitance, wherein the subset is less than the plurality of sensor electrodes and includes a first sensor electrode and a second sensor electrode;

drive the first sensor electrode and receive with the second sensor electrode to determine changes in transcapacitance between the first sensor electrode and the second sensor electrode; and determine positional information for an input object in a sensing region of the capacitive sensing device based on the changes in transcapacitance.

2. The input device of claim 1, wherein each of the plurality of sensor electrodes has a common shape and size.

3. The input device of claim 1, wherein driving the first sensor electrode and receiving with the second sensor electrode comprises driving a substantially constant voltage onto the first sensor electrode and modulating the second sensor electrode with a modulated signal, wherein an input object couples the substantially constant voltage with the modulated signal.

4. The input device of claim 1, wherein driving the first sensor electrode and receiving with the second sensor electrode comprises driving a transmitter signal on the first sensor electrode and receiving a resulting signal with the second sensor electrode.

5. The input device of claim 1, wherein the processing system is configured to drive the common electrodes with a display update signal for display updating, wherein the display update signal is based on a modulated reference signal having a first frequency; and wherein driving the first sensor electrode and receiving with the second sensor electrode comprises driving the first sensor electrode with a transmitter signal and receiving a resulting signal with the second sensor electrode, wherein the transmitter signal comprises a second frequency that is substantially orthogonal to the first frequency.

6. The input device of claim 1, wherein the processing system is further configured to modulate each of the plurality of sensor electrodes to determine changes in absolute capacitance in a time period, wherein the time period is selected from a group consisting of a time period that at least partially overlaps with display updating and a time period that is non-overlapping with display updating.

7. A processing system configured to drive a capacitive sensing device, the capacitive sensing device having a plurality of sensor electrodes arranged in a matrix, each sensor electrode comprising one or more common electrodes that are configured for both capacitive sensing and display updating, the processing system comprising:

a sensor module having sensor circuitry configured to modulate each of the plurality of sensor electrodes to determine changes in absolute capacitance, and configured to select a subset of the plurality of sensor electrodes based on determined changes in absolute capacitance, wherein the subset being less than the plurality of sensor electrodes and includes a first sensor electrode and a second sensor electrode;

wherein the sensor module is further configured to drive onto the first sensor electrode and receive with the second sensor electrode to determine changes in transcapacitance between the first sensor electrode and the second sensor electrode; and a determination module configured to determine positional information for an input object in a sensing region of the capacitive sensing device based on the changes in transcapacitance.

8. The processing system of claim 7, wherein driving the first sensor electrode and receiving with the second sensor electrode comprises driving a substantially constant voltage onto the first sensor electrode and modulate the second sensor electrode with a modulated signal, wherein an input object couples the substantially constant voltage with the modulated signal.

9. The processing system of claim 7, driving the first sensor electrode and receiving with the second sensor electrode comprises driving a transmitter signal on the first sensor electrode and receive a resulting signal with the second sensor electrode.

10. The processing system of claim 7, wherein the processing system is configured to drive the common electrodes with a display update signal for display updating, wherein the display update signal is based on a modulated reference signal having a first frequency; and wherein driving the first sensor electrode and receiving with the second sensor electrode comprises driving the first sensor electrode with a transmitter signal and receiving a resulting signal with the second sensor electrode, wherein the transmitter signal comprises a second frequency that is substantially orthogonal to the first frequency.

11. The processing system of claim 7, wherein the sensor circuitry of the sensor module further comprises:

a first plurality of analog front ends configured to modulate each of the plurality of sensor electrodes to determine changes in absolute capacitance; and a second plurality of analog front ends configured to receive resulting signals with the second sensor electrode to determine changes in transcapacitance.

12. The processing system of claim 11, wherein the sensor circuitry of the sensor module are configured to multiplex the second plurality of analog front ends to select the subset of the plurality of sensor electrodes.

13. The processing system of claim 7, wherein the sensor module is further configured to:

select a second subset of the plurality of sensor electrodes based on the determined changes in absolute capacitance, wherein the second subset is less than the plurality of sensor electrodes and includes a third sensor electrode and a fourth sensor electrode; and drive the third sensor electrode and receive with the fourth sensor electrode to determine changes in transcapacitance between the third sensor electrode and the fourth sensor electrode; and wherein the determination module is further configured to determine positional information for a second input in the sensing region based on the changes in transcapacitance between the third sensor electrode and the fourth sensor electrode.

14. The processing system of claim 13, wherein driving the first sensor electrode and receiving with the second sensor electrode and driving the third sensor electrode and receiving with the fourth sensor electrode occur simultaneously.

15. The processing system of claim 7, further comprising:

a display driver module configured to couple to the common electrodes and configured to drive the common electrodes for display updating; and an integrated controller comprising the sensor module and the display driver module.

16. The processing system of claim 7, further comprising:
a display driver module configured to couple the common electrodes and configured to drive the common electrodes for display updating;
a first integrated controller comprising at least a portion of the sensor module; and
a second integrated controller comprising the display driver module.

17. The processing system of claim 7, wherein the sensor module is further configured to modulate each of the plurality of sensor electrodes to determine changes in absolute capacitance in a time period, wherein the time period is selected from a group consisting of a time period that at least partially overlaps with display updating and a time period that is non-overlapping with display updating.

18. A method for detecting an input object in a sensing region of a capacitive sensing device, the capacitive sensing device having a plurality of sensor electrodes arranged in a matrix, the method comprising:

modulating each of the plurality of sensor electrodes with electrical signals to determine changes in absolute capacitance;
selecting a subset of the plurality of sensor electrodes based on the determined changes in absolute capacitance, wherein the subset is less than the plurality of sensor electrodes and includes a first sensor electrode and a second sensor electrode; and
driving the first sensor electrode and receiving with the second sensor electrode to determine changes in transcapacitance between the first sensor electrode and the second sensor electrode.

19. The method of claim 18, further comprising:
determining positional information based on the changes in transcapacitance.

20. The method of claim 18, further comprising driving a plurality of common electrodes for display updating, wherein each sensor electrode of the plurality of sensor electrodes comprises at least one common electrode of the plurality of common electrodes.

* * * * *